United States Patent [19]

Kurihara et al.

[11] Patent Number: 4,624,535
[45] Date of Patent: Nov. 25, 1986

[54] OBJECTIVE LENS SYSTEM FOR MICROSCOPES

[75] Inventors: Takashi Kurihara; Chikara Nagano, both of Tokyo, Japan

[73] Assignee: Olympus Optical Co., Ltd., Tokyo, Japan

[21] Appl. No.: 668,220

[22] Filed: Nov. 5, 1984

Related U.S. Application Data

[63] Continuation-in-part of Ser. No. 529,867, Sep. 7, 1983, abandoned.

[30] Foreign Application Priority Data

Sep. 10, 1982 [JP] Japan .................................. 57-156722
Mar. 16, 1984 [JP] Japan .................................. 59-46618

[51] Int. Cl.⁴ .......................... G02B 21/02; G02B 9/60
[52] U.S. Cl. .................................... 350/414; 350/465
[58] Field of Search ............................. 350/414, 465

[56] References Cited

U.S. PATENT DOCUMENTS

| | | | |
|---|---|---|---|
| 3,879,111 | 4/1975 | Goto | 350/414 |
| 4,184,747 | 1/1980 | Vetake | 350/414 |
| 4,403,835 | 9/1983 | Ushida | 350/414 |
| 4,417,787 | 11/1983 | Danner | 350/414 |
| 4,505,553 | 3/1985 | Asuma | 350/414 |

*Primary Examiner*—John K. Corbin
*Assistant Examiner*—Scott J. Sugarman
*Attorney, Agent, or Firm*—Cushman, Darby & Cushman

[57] ABSTRACT

An objective lens system for microscopes having a long working distance and aberrations favorably corrected to peripheral portion of visual field comprising a first meniscus lens component, a second positive lens component, a third cemented doublet consisting of a positive lens element and a nagative lens element, a fourth positive lens component and a fifth meniscus lens component.

10 Claims, 11 Drawing Figures

OBJECTIVE LENS SYSTEM FOR MICROSCOPES

This application is a continuation-in-part of my application, Ser. No. 529,867 filed Sept. 7, 1983, now abandoned.

BACKGROUND OF THE INVENTION (a) Field of the Invention

The present invention relates to an objective lens system for microscopes having a long working distance, aberrations correctly favorably to peripheral portion of visual field and a numerical aperture (NA) of 0.4.

(b) Description of the Prior Art

Generally speaking, objective lens systems for microscopes having longer working distances are more convenient for microscopy. Further, for microscopy with high resolution even at periphery of the visual field, it is necessary to design objective lens systems so as to have NA as large as possible and correct curvature of field favorably even at periphery of the visual fields.

As a conventional objective lens system for microscopes having a long working distance and an NA of 0.4, the one disclosed by Japanese unexamined published patent application No. 128154/77 has already been known to those skilled in the art. However, this objective lens system has a defect in that it cannot form a favorable image at periphery of the visual field due to remarkable curvature of field.

SUMMARY OF THE INVENTION

A general object of the present invention is to provide an objective lens system for microscopes having a long working distance, curvature of field favourably corrected and medium magnification level.

The objective lens system for microscopes according to the present invention comprises a first single-element or cemented doublet lens component having a concave surface on the object side, a second positive lens component, a third cemented doublet lens component consisting of a positive lens element and a negative lens element, a fourth positive lens component and a fifth meniscus lens component having a convex surface on the object side and comprising a single lens element or cemented doublet, said objective lens system being arranged that the working distance WD is larger than 0.4f (WD>0.4 f) and said objective lens system satisfies the following conditions (a) and (b):

$$R_a/R_b < 1.0 \tag{a}$$

$$0.3f < D_4 < 2.0f \tag{b}$$

wherein the reference symbols are defined as follows:
$R_a$ and $R_b$: radii of curvature on the surfaces on the object side and image side of said first single-element or cemented doublet lens component
$D_4$: airspace between said fourth positive lens component and said fifth meniscus lens component
f: focal length of said objective lens system as whole The condition (a) is required in order to maintain flatness of image plane by keeping the working distance long. If $R_a/R_b$ is larger than the limit defined by the condition (a), flatness of image plane will become unfavorable.

As an objective lens system for microscopes is to be used in combination with an eyepiece, curvature of field of the objective lens system should be corrected by taking curvature of field of the eyepiece into consideration. Therefore, for an objective lens system for microscopes, it is preferable to arrange that the image plane slightly inclines toward the "plus" side.

The objective lens system for microscopes according to the present invention is arranged to that the image plane of an optical system, which is formed by combining said objective lens system with an eyepiece, becomes flat by arranging to satisfy said condition (a).

The condition (b) has been adopted in order to favorably correct chromatic aberration and coma by keeping the working distance long. The working distance of the objective lens system according to the present invention has been made extremely long by selecting the airspace $D_4$ within the range defined by the condition (b).

If $D_4$ is smaller than the lower limit of the condition (b), it will be difficult to correct coma. If $D_4$ is larger than the upper limit of the condition (b), it will be difficult to correct lateral chromatic aberration and, moreover, coma will not be corrected satisfactorily favorably.

The objective lens system according to the present invention which satisfies the conditions (a) and (b) enables to make the working distance (WD) larger than 0.4f as described so far. Therefore, the present invention enables to provide an objective lens system for microscopes with an extremely long working distance compared with known objective lens systems for microscopes. This will be evident also from the fact that the working distance of respective embodiments shown later are all larger than 0.5f.

The objective lens system for microscopes according to the present invention is arranged so as to further satisfy the following conditions (1), (2) and (3):

$$D_1 + D_5 > 0.8f \tag{1}$$

$$\nu_{3p} - \nu_{3n} > 40 \tag{2}$$

$$f_4 > 2.0f \tag{3}$$

wherein the reference symbols are defined as follows:
$D_1$ and $D_5$: thicknesses of said first and fifth lens components respectively
$\nu_{3p}$ and $\nu_{3n}$: Abbe's numbers of the positive and negative elements respectively of said third lens component
$f_4$: focal length of said fourth lens component
f: focal length of said objective lens system as a whole In order to prolong working distance of the objective lens system for microscopes having the above-described composition, it is sufficient to design said fifth lens component so as to have high power. In this case, however, it will be difficult to favorably correct aberrations produced by increasing power of said fifth lens component. In the objective lens system for microscopes according to the present invention, power of the fifth lens component is increased and aberrations, especially curvature of field, are favorably corrected by designing said lens system so as to satisfy the above-mentioned conditions (1) through (3).

The condition (1) has been adopted to maintain image flatness to periphery of visual field. Speaking more concretely, it is generally necessary to design Petzval's sum so as to have a negative value or a value close to zero in order to maintain flatness of image plane. For this purpose, the objective lens system according to the present invention adopts the first and fifth lens components which are designed as thick meniscus lens components and whose thicknesses are so designed as to satisfy the condition (1), thereby making it possible to favorably correct Petzval's sum and observe images at peripheral portion of visual field with nearly the same resolution as that at the center thereof. If thicknesses of the first and fifth lens components are smaller than the limit defined by the condition (1), the effect to correct Petzval's sum will be lowered and curvature of field will be undercorrected.

The condition (2) has been adopted for correcting longitudinal chromatic aberration and lateral chromatic aberration. Speaking concretely, the above-mentioned chromatic aberrations have been favorably corrected by designing the third lens component as a cemented doublet consisting of a positive element and a negative element having Abbe's numbers $\nu_{3p}$ and $\nu_{3n}$ respectively satisfying the condition (2). It will therefore be difficult to correct the chromatic aberrations if this condition is not satisfied.

The condition (3) defines power of the fourth lens components for correcting chromatic aberration of spherical aberration. If this condition (3) is not satisfied, the forth lens component will have too high power, thereby curving the chromatic aberration of spherical aberration in the opposite direction and producing outer coma which can hardly be corrected.

In order to favorably correcting spherical aberration, the objective lens system should desirably satisfy the following additional condition (4):

$$f_2 < 3.0f \qquad (4)$$

wherein the reference symbol $f_2$ represents focal length of the second lens component.

In the objective lens system according to the present invention, relatively large negative spherical aberration is produced by the first meniscus lens component. If this spherical aberration is not corrected by the second lens component to a certain degree, the undercorrected spherical aberration which is produced by the front lens components will be too large to be corrected favorably by the rear lens components. When the condition (4) is satisfied, the above-mentioned undercorrected spherical aberration can be corrected favorably by the second lens component. If this condition (4) is not satisfied, the second lens component will have insufficient function to correct the spherical aberration, resulting in undercorrection of the spherical aberration in the objective lens system as a whole.

DETAILED DESCRIPTION OF THE PREFERRED EMBODIMENTS

Figure 1:
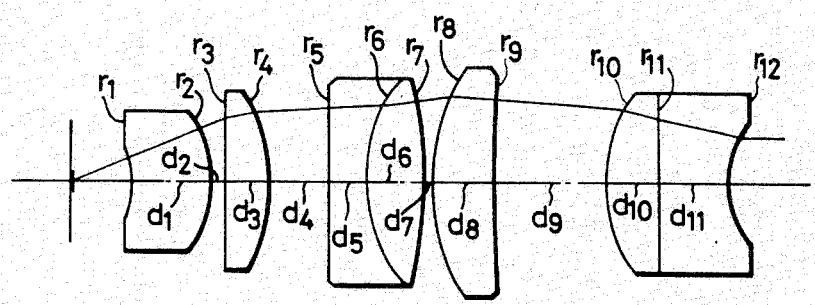
FIG. 1 through FIG. 5 show sectional views illustrating compositions of embodiments 1 through 5 of the objective lens systems for microscopes according to the present invention.

Now, some preferred embodiments of the objective lens system for microscopes according to the present invention will be described below:

Embodiment 1
$f = 1$, NA $= 0.4$, $\beta = -20X$, WD $= 0.521$ $r_1 = -0.569$
$d_1 = 0.667$, $n_1 = 1.61405$, $\nu_1 = 54.95$
$r_2 = -0.998$
$d_2 = 0.142$
$r_3 = 37.389$
$d_3 = 0.392$, $n_2 = 1.59270$, $\nu_2 = 35.29$
$r_4 = -1.378$
$d_4 = 0.509$
$r_5 = -359.613$
$d_5 = 0.322$, $n_3 = 1.80518$, $\nu_3 = 25.43$
$r_6 = 1.282$
$d_6 = 0.515$, $n_4 = 1.49700$, $\nu_4 = 81.61$
$r_7 = -3.380$
$d_7 = 0.058$
$r_8 = 1.658$
$d_8 = 0.531$, $n_5 = 1.48749$, $\nu_5 = 70.15$
$r_9 = 10.464$
$d_9 = 1.012$
$r_{10} = 1.328$
$d_{10} = 0.429$, $n_6 = 1.69700$, $\nu_6 = 48.51$
$r_{11} = 12.571$
$d_{11} = 0.618$, $n_7 = 1.6968$, $\nu_7 = 56.49$
$r_{12} = 0.726$
$f_2 = 2.25$, $f_4 = 3.96$
thickness of cover glass $= 0.022$ Embodiment 2
$f = 1$, NA $= 0.4$, $\beta = -20X$, WD $= 0.521$ $r_1 = -0.670$
$d_1 = 0.228$, $n_1 = 1.64769$, $\nu_1 = 33.8$
$r_2 = 2.472$
$d_2 = 0.451$, $n_2 = 1.69680$, $\nu_2 = 56.49$
$r_3 = -1.060$
$d_3 = 0.143$
$r_4 = -15.570$
$d_4 = 0.409$, $n_3 = 1.58904$, $\nu_3 = 53.20$
$r_5 = -1.427$
$d_5 = 0.411$
$r_6 = -13.374$
$d_6 = 0.326$, $n_4 = 1.74000$, $\nu_4 = 31.70$
$r_7 = 1.454$
$d_7 = 0.509$, $n_5 = 1.49700$, $\nu_5 = 81.61$
$r_8 = -3.486$
$d_8 = 0.160$
$r_9 = 2.442$
$d_9 = 0.363$, $n_6 = 1.49700$, $\nu_6 = 81.61$
$r_{10} = -25.580$
$d_{10} = 0.900$
$r_{11} = 1.242$
$d_{11} = 1.095$, $n_7 = 1.74950$, $\nu_7 = 35.27$
$r_{12} = 0.681$
$f_2 = 2.64$, $f_4 = 4.50$
thickness of cover glass $= 0.022$ Embodiment 3
$f = 1$, NA $= 0.4$, $\beta = -20X$, WD $= 0.522$ $r_1 = -0.611$
$d_1 = 0.677$, $n_1 = 1.86300$, $\nu_1 = 41.53$
$r_2 = -1.062$
$d_2 = 0.144$
$r_3 = 21.561$
$d_3 = 0.397$, $n_2 = 1.59270$, $\nu_2 = 35.29$
$r_4 = -1.407$
$d_4 = 0.360$
$r_5 = -14.741$
$d_5 = 0.327$, $n_3 = 1.80518$, $\nu_3 = 25.43$
$r_6 = 1.303$
$d_6 = 0.522$, $n_4 = 1.49700$, $\nu_4 = 81.61$
$r_7 = -3.062$
$d_7 = 0.071$
$r_8 = 1.708$
$d_8 = 0.510$, $n_5 = 1.49700$, $\nu_5 = 81.61$
$r_9 = 14.944$
$d_9 = 1.000$
$r_{10} = 1.295$
$d_{10} = 0.435$, $n_6 = 1.59270$, $\nu_6 = 35.29$
$r_{11} = 5.436$
$d_{11} = 0.627$, $n_7 = 1.61340$, $\nu_7 = 43.84$
$r_{12} = 0.728$
$f_2 = 2.24$, $f_4 = 3.83$ -continued thickness of cover glass = 0.022

Embodiment 4
f = 1, NA = 0.4, β = −20X, WD = 0.519

| | | |
|---|---|---|
| $r_1 = -0.523$ | | |
| $d_1 = 0.573$ | $n_1 = 1.61405$ | $\nu_1 = 54.95$ |
| $r_2 = -0.847$ | | |
| $d_2 = 0.142$ | | |
| $r_3 = -62.824$ | | |
| $d_3 = 0.394$ | $n_2 = 1.60717$ | $\nu_2 = 40.26$ |
| $r_4 = -1.338$ | | |
| $d_4 = 0.400$ | | |
| $r_5 = 21.045$ | | |
| $d_5 = 0.324$ | $n_3 = 1.78470$ | $\nu_3 = 26.22$ |
| $r_6 = 1.279$ | | |
| $d_6 = 0.518$ | $n_4 = 1.49700$ | $\nu_4 = 81.61$ |
| $r_7 = -3.872$ | | |
| $d_7 = 0.174$ | | |
| $r_8 = 1.755$ | | |
| $d_8 = 0.384$ | $n_5 = 1.49700$ | $\nu_5 = 81.61$ |
| $r_9 = 7.938$ | | |
| $d_9 = 1.197$ | | |
| $r_{10} = 1.137$ | | |
| $d_{10} = 0.855$ | $n_6 = 1.68600$ | $\nu_6 = 49.16$ |
| $r_{11} = 0.677$ | | |
| $f_2 = 2.25$, | $f_4 = 4.44$ | | thickness of cover glass = 0.022

Embodiment 5
f = 1, NA = 0.4, β = −20X, WD = 0.501

| | | |
|---|---|---|
| $r_1 = -0.245$ | | |
| $d_1 = 0.177$ | $n_1 = 1.60311$ | $\nu_1 = 60.70$ |
| $r_2 = -0.379$ | | |
| $d_2 = 0.062$ | | |
| $r_3 = -4.383$ | | |
| $d_3 = 0.376$ | $n_2 = 1.60311$ | $\nu_2 = 60.70$ |
| $r_4 = -0.840$ | | |
| $d_4 = 0.019$ | | |
| $r_5 = -25.552$ | | |
| $d_5 = 0.248$ | $n_3 = 1.78470$ | $\nu_3 = 26.22$ |
| $r_6 = 1.108$ | | |
| $d_6 = 0.433$ | $n_4 = 1.49700$ | $\nu_4 = 81.61$ |
| $r_7 = -2.365$ | | |
| $d_7 = 0.555$ | | |
| $r_8 = 2.328$ | | |
| $d_8 = 0.345$ | $n_5 = 1.62364$ | $\nu_5 = 36.54$ |
| $r_9 = -3.048$ | | |
| $d_9 = 0.410$ | | |
| $r_{10} = 1.238$ | | |
| $d_{10} = 0.537$ | $n_6 = 1.51633$ | $\nu_6 = 64.15$ |
| $r_{11} = -11.121$ | | |
| $d_{11} = 0.218$ | $n_7 = 1.67270$ | $\nu_7 = 32.10$ |
| $r_{12} = 0.768$ | | |
| $f_2 = 1.66$, | $f_4 = 2.17$ | | thickness of cover glass = 0.021 wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements and the reference symbols $\nu_1, \nu_2, \ldots$ represent Abbe's numbers of the respective lens elements.

Figure 2:
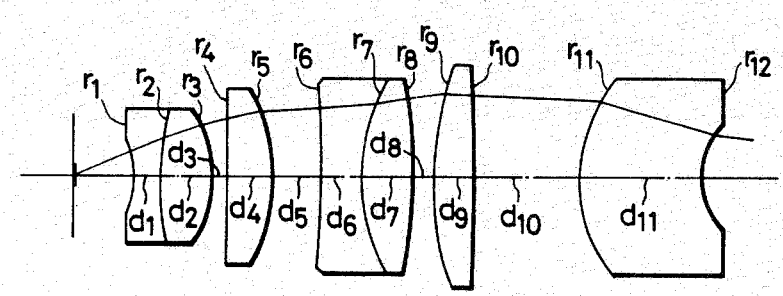
Figure 3:
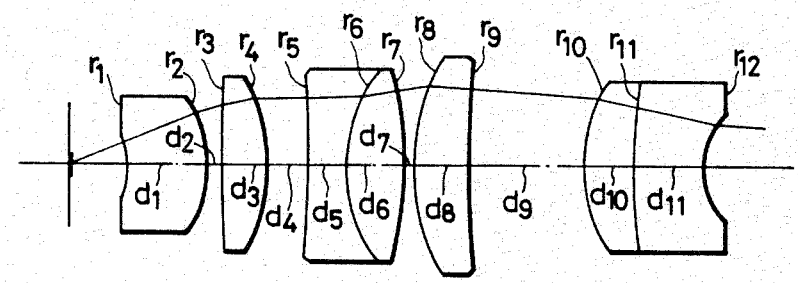
Figure 4:
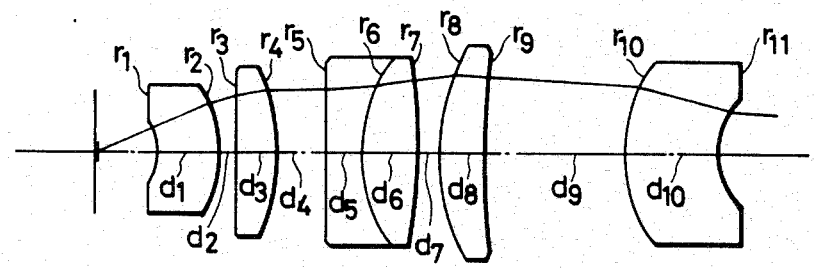
Figure 5:
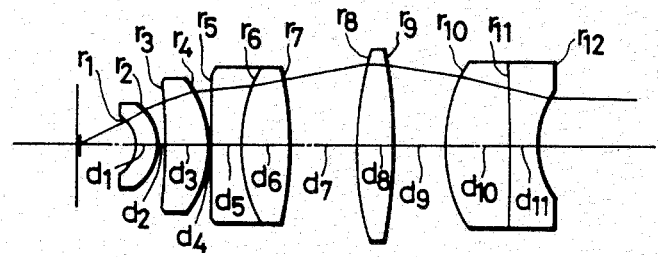
Figure 6:
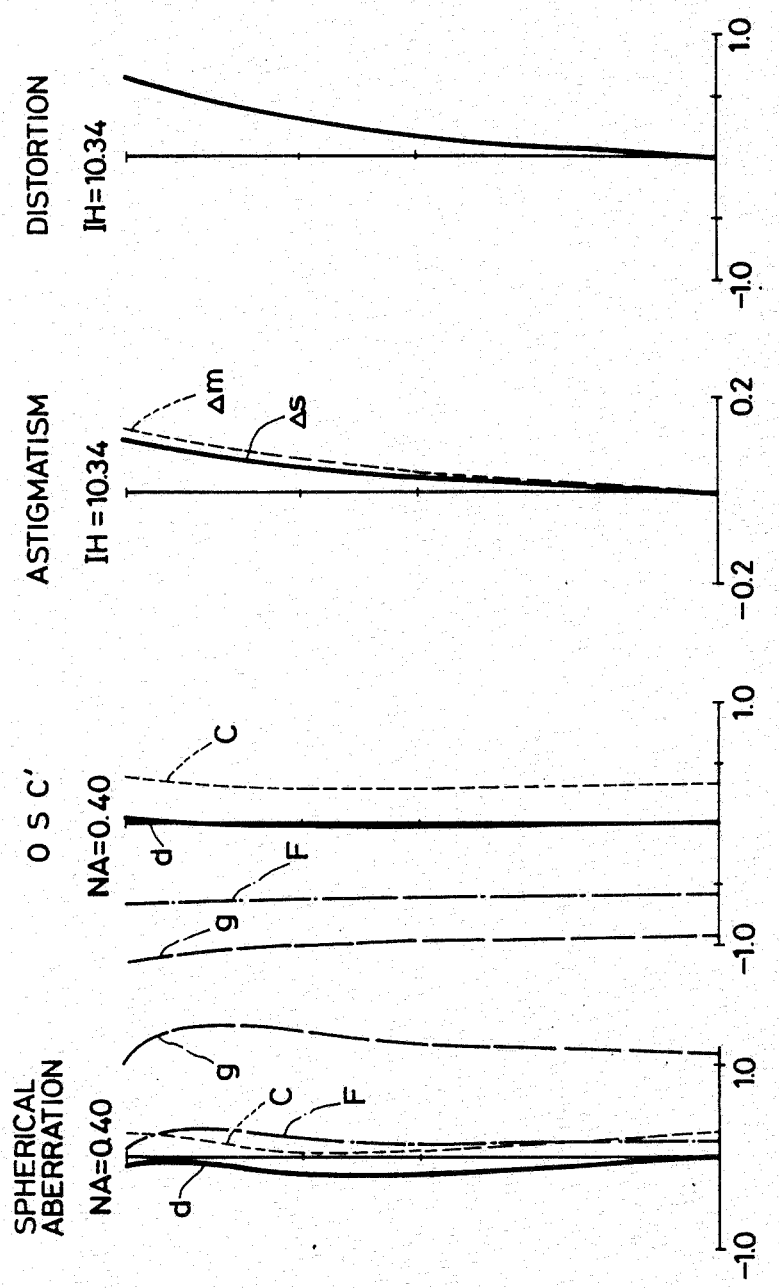
FIG. 6 through FIG. 10 show curves illustrating the aberration characteristics of the embodiments 1 through 5.
Figure 7:
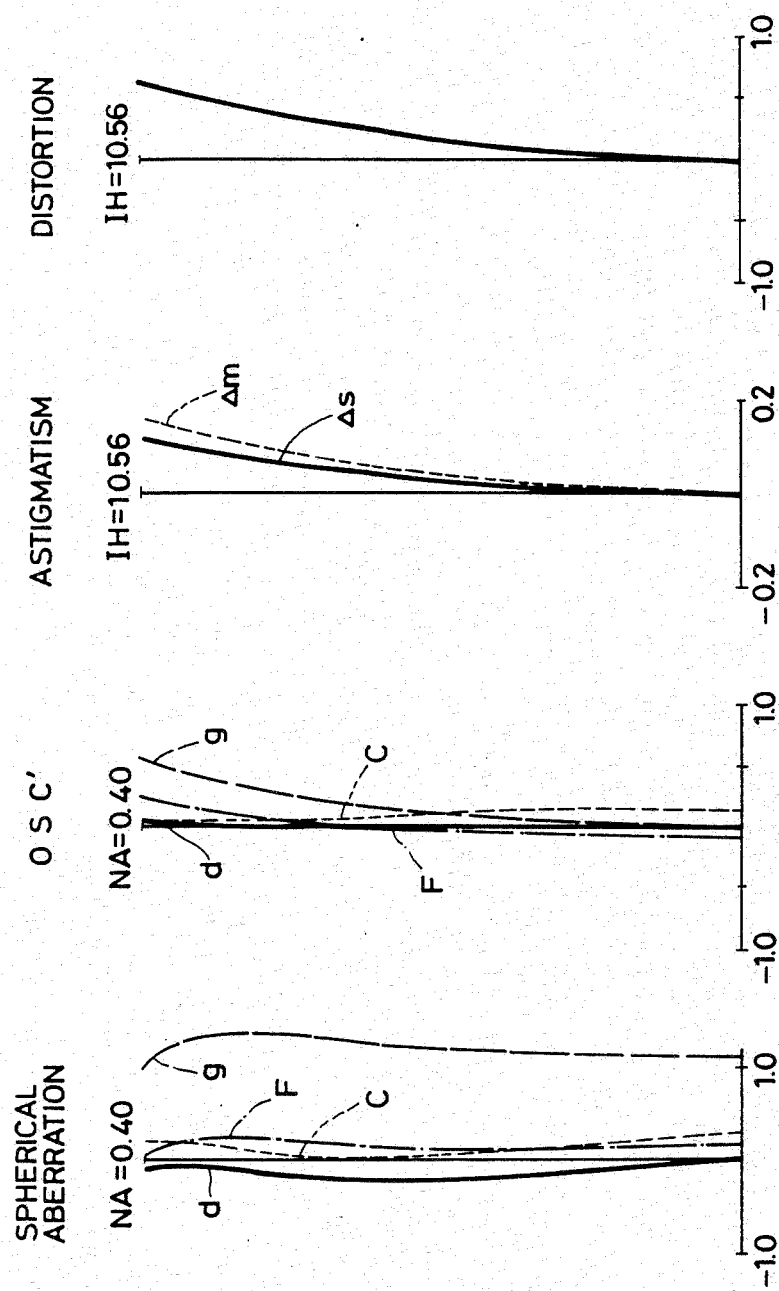
Figure 8:
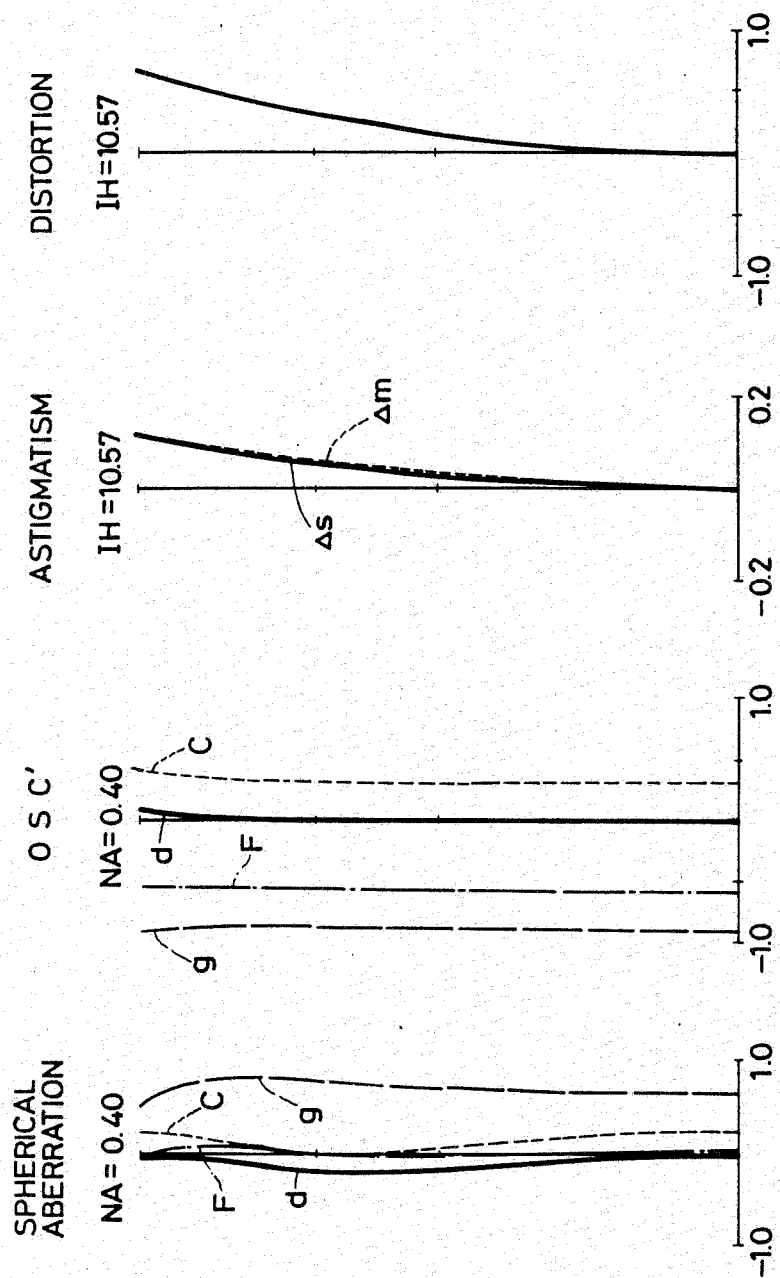
Figure 9:
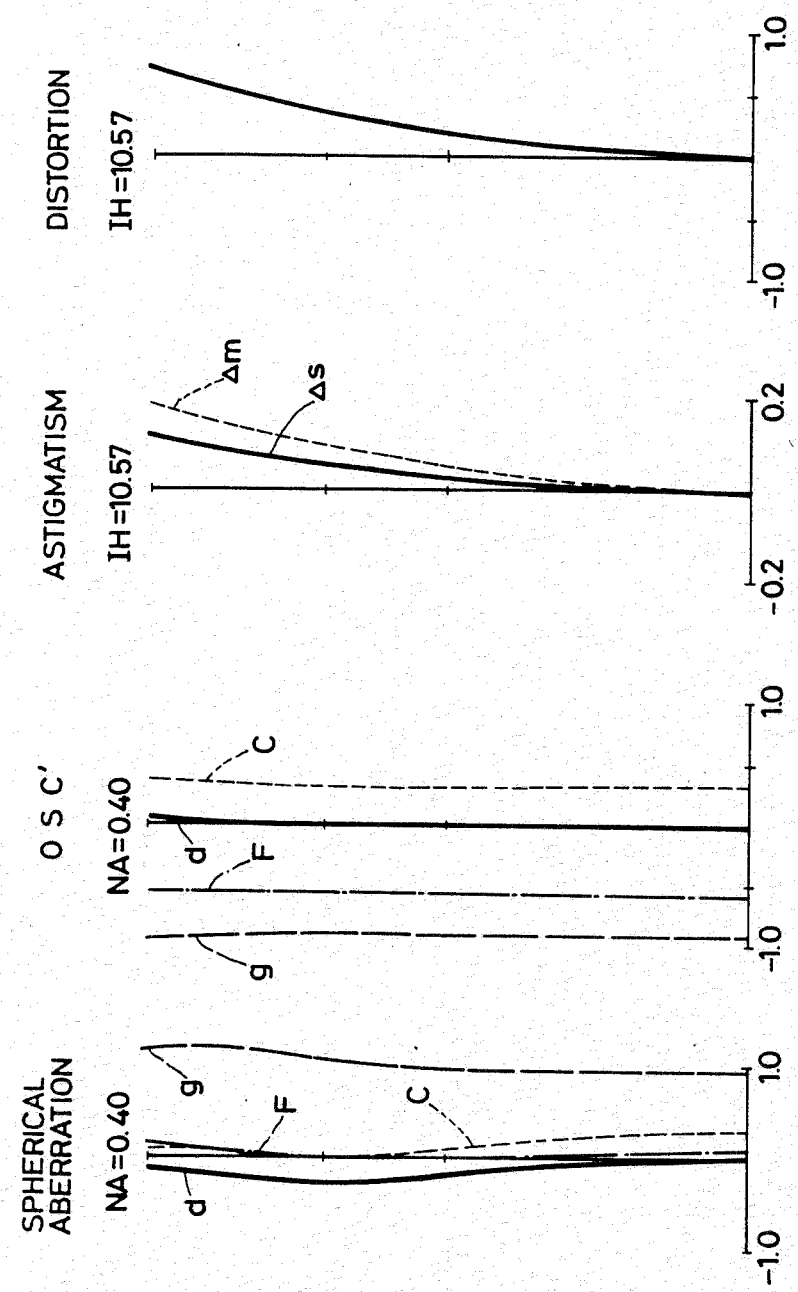
Figure 10:
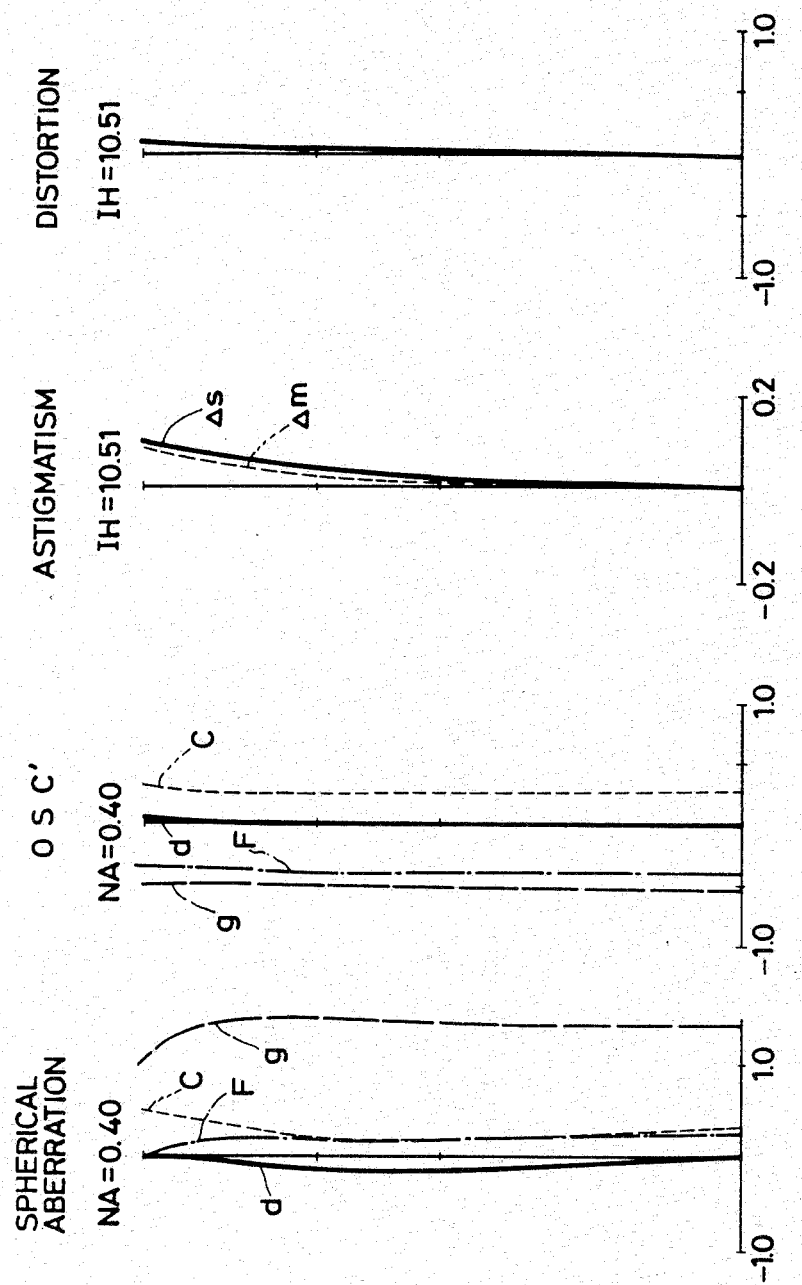

Out of the embodiments described above, Embodiment 1 is an objective lens system having the composition shown is FIG. 1. Speaking concretely, the first lens component is a single-element component and the fifth lens component is a cemented doublet. Therefore, Embodiment 1 has numerical data of $Ra=r_1$, $Rb=r_2$, $D_4=d_9$, $D_1+D_5=d_1+d_{10}+d_{11}=1.714$ and $\nu_{3p}-\nu_{3n}=\nu_4-\nu_3=56.18$. Further, Embodiment 2 is the lens system having the composition shown in FIG. 2 in which the first lens component and the fifth lens component are designed as a cemented doublet and a single-element component respectively. Therefore Embodiment 2 has numerical data of $R_a=r_1$, $R_b=r_3$, $D_4=d_{10}$, $D_1+D_5=d_1+d_2+d_{11}=1.774$ and $\nu_{3p}-\nu_{3n}=\nu_5-\nu_4=49.91$. Embodiment 3 is a lens system having the composition illustrated in FIG. 3 in which the first lens component and the fifth lens component are designed as a single-element component and a cemented doublet respectively. Therefore, Embodiment 3 has numerical data of $R_a=r_1$, $R_b=r_3$, $D_4=d_9$, $D_1+D_5=d_1+d_{10}+d_{11}=1.739$ and $\nu_{3p}-\nu_{3n}=\nu_4-\nu_3=56.18$. Embodiment 4 is a lens system having the composition illustrated in FIG. 4 in which both the first lens component and the fifth lens component are designs as single element components respectively. Therefore, Embodiment 4 has numerical data of $R_a=r_1$, $R_b=r_2$, $D_4=d_9$, $D_1+D_5=d_1+d_{10}=1.428$ and $\nu_{3p}-\nu_{3n}=\nu_4-\nu_3=55.39$. Embodiment 5 is a lens system having the composition illustrated in FIG. 5 in which the first lens component and the fifth lens component are designed as a single-element component and a cemented doublet respectively. Therefore, Embodiment 5 has numerical data of $R_a=r_1$, $R_b=r_2$, $D_4=d_9$, $D_1+D_5=d_1+d_{10}+d_{11}=0.932$ and $\nu_{3p}-\nu_{3n}=\nu_4-\nu_3=55.39$.

Each of Embodiments 1 through 4 is so designed as to be capable of adjusting the airspace reserved between the second and third lens components for correcting aberrations which are aggravated by using a cover glass of different thickness (when thickness of cover glass varies within a range from 0 to 2 mm). When the objective lens system described as Embodiment 2 is equipped with a cover glass 2 mm thick (0.265 which f is taken as 1), for example, it permits correcting aggravated aberrations by adjusting $d_4$ so as to obtain the following numerical data:

| | | |
|---|---|---|
| f = 1, | NA = 0.4, | β = −20X |
| WD = 0.374, | $d_4 = 0.204$ | |

Figure 11:
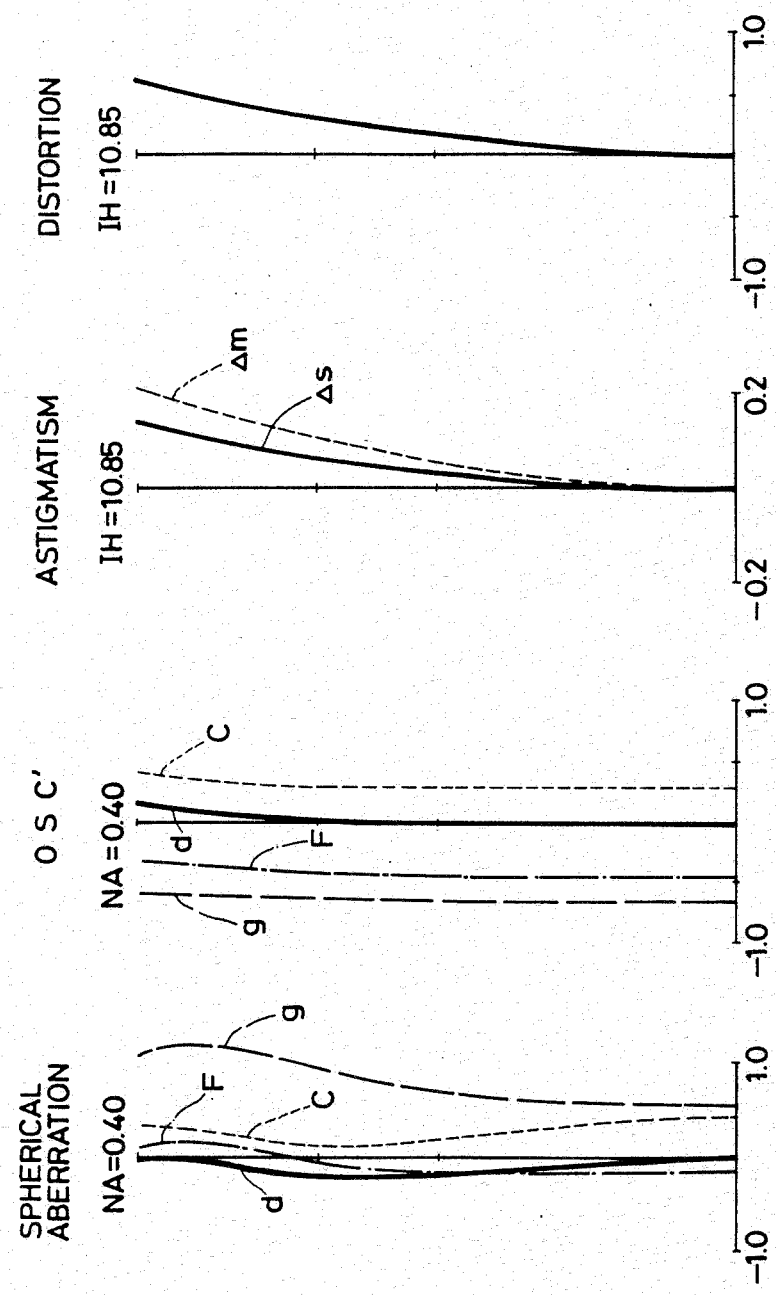
FIG. 11 shows curves illustrating the aberration characteristics of the embodiment 1 when it is equipped with a cover glass 2 mm thick.

Aberrations in this condition are illustrated in FIG. 11.

We claim:

1. An objective lens system for microscopes consisting of a first meniscus lens component having a concave surface on the object side, a second positive lens component, a third cemented doublet consisting of a positive lens element and a negative lens element, a fourth positive lens component and a fifth meniscus lens component having a convex surface on the object side, said objective lens system being so designed that the working distance thereof is larger than 0.4f and said objective lens system satisfies the following conditions (a) and (b):

$$R_a/R_b < 1.0 \qquad (a)$$

$$0.3f < D_4 < 2.0f \qquad (b)$$

wherein the reference symbols $R_a$ and $R_b$ respectively represent radii of curvature on the surfaces on the object side and image side of said first lens component, the reference symbol $D_4$ represents the airspace between said fourth lens component and said fifth lens component and the reference symbol f represents the focal length of said objective lens system as a whole.

2. An objective lens system for microscopes according to claim 1 further satisfying the following conditions (1), (2) and (3):

$$D_1 + D_5 > 0.8f \qquad (1)$$

$$\nu_{3p}+\nu_{3n}>40 \quad (2)$$

$$f_4>2.0f \quad (3)$$

wherein the reference symbols $D_1$ and $D_5$ represent thicknesses of said first lens component and the fifth lens component respectively, the reference symbols $\nu_{3p}$ and $\nu_{3n}$ designate Abbe's numbers of the positive element and the negative element respectively of said third lens component, the reference symbol $f_4$ denotes focal length of said fourth lens component.

3. An objective lens system for microscope according to claim 1 satisfying additionally the following condition (4):

$$f_2<3.0f \quad (4)$$

wherein the reference symbol $f_2$ represents focal length of said second lens component.

4. An objective lens system for microscopes according to claim 3 having the following numerical data:

| $f = 1$, NA $= 0.4$, $\beta = -20X$, WD $= 0.521$ | | |
|---|---|---|
| $r_1 = -0.569$ | | |
| $d_1 = 0.667$ | $n_1 = 1.61405$ | $\nu_1 = 54.95$ |
| $r_2 = -0.998$ | | |
| $d_2 = 0.142$ | | |
| $r_3 = 37.389$ | | |
| $d_3 = 0.392$ | $n_2 = 1.59270$ | $\nu_2 = 35.29$ |
| $r_4 = -1.378$ | | |
| $d_4 = 0.509$ | | |
| $r_5 = -359.613$ | | |
| $d_5 = 0.322$ | $n_3 = 1.80518$ | $\nu_3 = 25.43$ |
| $r_6 = 1.282$ | | |
| $d_6 = 0.515$ | $n_4 = 1.49700$ | $\nu_4 = 81.61$ |
| $r_7 = -3.380$ | | |
| $d_7 = 0.058$ | | |
| $r_8 = 1.658$ | | |
| $d_8 = 0.531$ | $n_5 = 1.48749$ | $\nu_5 = 70.15$ |
| $r_9 = 10.464$ | | |
| $d_9 = 1.012$ | | |
| $r_{10} = 1.328$ | | |
| $d_{10} = 0.429$ | $n_6 = 1.69700$ | $\nu_6 = 48.51$ |
| $r_{11} = 12.571$ | | |
| $d_{11} = 0.618$ | $n_7 = 1.6968$ | $\nu_7 = 56.49$ |
| $r_{12} = 0.726$ | | |
| $f_2 = 2.25$, | $f_4 = 3.96$ | |
| thickness of cover glass $= 0.022$ | | | wherein the reference symbols $r_1$ through $r_{12}$ represent radii of curvature on the surfaces of the respective lens elements, the reference symbols $d_1$ through $d_{11}$ designate thicknesses of the respective lens elements and airspaces reserved therebetween, the reference symbols $n_1$ through $n_7$ denote refractive indices of the respective lens elements and the reference symbols $\nu_1$ through $\nu_7$ represent Abbe's numbers of the respective lens elements.

5. An objective lens system for microscopes according to claim 3 having the following numerical data:

| $f = 1$, NA $= 0.4$, $\beta = -20X$, WD $= 0.522$ | | |
|---|---|---|
| $r_1 = -0.611$ | | |
| $d_1 = 0.677$ | $n_1 = 1.86300$ | $\nu_1 = 41.53$ |
| $r_2 = -1.062$ | | |
| $d_2 = 0.144$ | | |
| $r_3 = 21.561$ | | |
| $d_3 = 0.397$ | $n_2 = 1.59270$ | $\nu_2 = 35.29$ |
| $r_4 = -1.407$ | | |
| $d_4 = 0.360$ | | |
| $r_5 = -14.741$ | | |
| $d_5 = 0.327$ | $n_3 = 1.80518$ | $\nu_3 = 25.43$ |
| $r_6 = 1.303$ | | |
| $d_6 = 0.522$ | $n_4 = 1.49700$ | $\nu_4 = 81.61$ |
| $r_7 = -3.062$ | | |
| $d_7 = 0.071$ | | |
| $r_8 = 1.708$ | | |
| $d_8 = 0.510$ | $n_5 = 1.49700$ | $\nu_5 = 81.61$ |
| $r_9 = 14.944$ | | |
| $d_9 = 1.000$ | | |
| $r_{10} = 1.295$ | | |
| $d_{10} = 0.435$ | $n_6 = 1.59270$ | $\nu_6 = 35.29$ |
| $r_{11} = 5.436$ | | |
| $d_{11} = 0.627$ | $n_7 = 1.61340$ | $\nu_7 = 43.84$ |
| $r_{12} = 0.728$ | | |
| $f_2 = 2.24$, | $f_4 = 3.83$ | |
| thickness of cover glass $= 0.022$ | | | wherein the reference symbols $r_1$ through $r_{12}$ represent radii of curvature on the surfaces of the respective lens elements, the reference symbols $d_1$ through $d_{11}$ designate thicknesses of the respective lens elements and airspaces reserved therebetween, the reference symbols $n_1$ through $n_7$ denote refractive indices of the respective lens elements and the reference symbols $\nu_1$ through $\nu_7$ respective Abbe's numbers of the respective lens elements.

6. An objective lens system for microscopes according to claim 3 having the following numerical data:

| $f = 1$, NA $= 0.4$, $\beta = -20X$, WD $= 0.501$ | | |
|---|---|---|
| $r_1 = -0.245$ | | |
| $d_1 = 0.177$ | $n_1 = 1.60311$ | $\nu_1 = 60.70$ |
| $r_2 = 0.379$ | | |
| $d_2 = 0.062$ | | |
| $r_3 = -4.383$ | | |
| $d_3 = 0.376$ | $n_2 = 1.60311$ | $\nu_2 = 60.70$ |
| $r_4 = -0.840$ | | |
| $d_4 = 0.019$ | | |
| $r_5 = -25.552$ | | |
| $d_5 = 0.248$ | $n_3 = 1.78470$ | $\nu_3 = 26.22$ |
| $r_6 = 1.108$ | | |
| $d_6 = 0.433$ | $n_4 = 1.49700$ | $\nu_4 = 81.61$ |
| $r_7 = -2.365$ | | |
| $d_7 = 0.555$ | | |
| $r_8 = 2.328$ | | |
| $d_8 = 0.345$ | $n_5 = 1.62364$ | $\nu_5 = 36.54$ |
| $r_9 = -3.048$ | | |
| $d_9 = 0.410$ | | |
| $r_{10} = 1.238$ | | |
| $d_{10} = 0.537$ | $n_6 = 1.51633$ | $\nu_6 = 64.15$ |
| $r_{11} = -11.121$ | | |
| $d_{11} = 0.218$ | $n_7 = 1.67270$ | $\nu_7 = 32.10$ |
| $r_{12} = 0.768$ | | |
| $f_2 = 1.66$, | $f_4 = 2.17$ | |
| thickness of cover glass $= 0.021$ | | | wherein the reference symbols $r_1$ through $r_{12}$ represent radii of curvature on the surfaces of the respective lens elements, the reference symbols $d_1$ through $d_{11}$ designate thicknesses of the respective lens elements and airspaces reserved therebetween, the reference symbols $n_1$ through $n_7$ denote refractive indices of the respective lens elements and the reference symbols $\nu_1$ through $\nu_7$ represent Abbe's numbers of the respective lens elements.

7. An objective lens system for microscopes according to claim 2 wherein said first lens component and said fifth lens component are designed as a cemented doublet and a single-element lens component respectively.

8. An objective lens system for microscopes according to claim 7 having the following numerical data:

| $f = 1$, NA 0.4, $\beta = -20X$, WD $= 0.521$ | | | |
|---|---|---|---|
| $r_1 = -0.670$ | | | |
| $d_1 = 0.228$ | $n_1 = 1.64769$ | $\nu_1 = 33.8$ | |
| $r_2 = 2.472$ | | | |
| $d_2 = 0.451$ | $n_2 = 1.69680$ | $\nu_2 = 56.49$ | |
| $r_3 = -1.060$ | | | |
| $d_3 = 0.143$ | | | |
| $r_4 = -15.570$ | | | |
| $d_4 = 0.409$ | $n_3 = 1.58904$ | $\nu_3 = 53.20$ | |
| $r_5 = -1.427$ | | | |
| $d_5 = 0.411$ | | | |
| $r_6 = -13.374$ | | | |
| $d_6 = 0.326$ | $n_4 = 1.74000$ | $\nu_4 = 31.70$ | |
| $r_7 = 1.454$ | | | |
| $d_7 = 0.509$ | $n_5 = 1.49700$ | $\nu_5 = 81.61$ | |
| $r_8 = -3.486$ | | | |
| $d_8 = 0.160$ | | | |
| $r_9 = 2.442$ | | | |
| $d_9 = 0.363$ | $n_6 = 1.49700$ | $\nu_6 = 81.61$ | |
| $r_{10} = -25.580$ | | | |
| $d_{10} = 0.900$ | | | |
| $r_{11} = 1.242$ | | | |
| $d_{11} = 1.095$ | $n_7 = 1.74950$ | $\nu_7 = 35.27$ | |
| $r_{12} = 0.681$ | | | |
| $f_2 = 2.64$, | $f_4 = 4.50$ | | |
| thickness of cover glass = 0.022 | | | | wherein the reference symbols $r_1$ through $r_{12}$ represent radii of curvature on the surfaces of the respective lens elements, the reference symbols $d_1$ through $d_{11}$ designate thicknesses of the respective lens elements and airspaces reserved therebetween, the reference symbols $n_1$ through $n_7$ denote refractive indices of the respective lens elements and the reference symbols $\nu_1$ through $\nu_7$ represent Abbe's numbers of the respecitve lens elements.

9. An objective lens system for microscopes according to claim 2 wherein said first lens component and said fifth lens component are designed as single-element lens components respectively.

10. An objective lens system for microscopes according to claim 9 having the following numerical data:

| $f = 1$, NA $= 0.4$, $\beta = -20X$, WD $= 0.519$ | | | |
|---|---|---|---|
| $r_1 = -0.523$ | | | |
| $d_1 = 0.573$ | $n_1 = 1.61405$ | $\nu_1 = 54.95$ | |
| $r_2 = -0.847$ | | | |
| $d_2 = 0.142$ | | | |
| $r_3 = -62.824$ | | | |
| $d_3 = 0.394$ | $n_2 = 1.60717$ | $\nu_2 = 40.26$ | |
| $r_4 = -1.338$ | | | |
| $d_4 = 0.400$ | | | |
| $r_5 = 21.045$ | | | |
| $d_5 = 0.324$ | $n_3 = 1.78470$ | $\nu_3 = 26.22$ | |
| $r_6 = 1.279$ | | | |
| $d_6 = 0.518$ | $n_4 = 1.49700$ | $\nu_4 = 81.61$ | |
| $r_7 = -3.872$ | | | |
| $d_7 = 0.174$ | | | |
| $r_8 = 1.755$ | | | |
| $d_8 = 0.384$ | $n_5 = 1.49700$ | $\nu_5 = 81.61$ | |
| $r_9 = 7.938$ | | | |
| $d_9 = 1.197$ | | | |
| $r_{10} = 1.137$ | | | |
| $d_{10} = 0.855$ | $n_6 = 1.68600$ | $\nu_6 = 49.16$ | |
| $r_{11} = 0.677$ | | | |
| $f_2 = 2.25$, | $f_4 = 4.44$ | | |
| thickness of cover glass = 0.022 | | | | wherein the reference symbols $r_1$ through $r_{11}$ represent radii of curvature on the surfaces of the respective lens elements, the reference symbols $d_1$ through $d_{10}$ designate thicknesses of the respective lens elements and airspaces reserved therebetween, the reference symbols $n_1$ through $n_6$ denote refractive indices of the respective lens elements and the reference symbols $\nu_1$ through $\nu_6$ represent Abbe's numbers of the respective lens elements.

* * * * *